US012432133B2

(12) United States Patent
Brissette et al.

(10) Patent No.: US 12,432,133 B2
(45) Date of Patent: *Sep. 30, 2025

(54) SOURCE-PROVISIONED SERVICES INFRASTRUCTURE

(71) Applicant: Cisco Technology, Inc., San Jose, CA (US)

(72) Inventors: Patrice Brissette, Gatineau (CA); Thierry Couture, Mont-Royal (CA); Karen Michele Cadora, Boulder, CO (US); Jiri Chaloupka, San Jose, CA (US); Suresh Basavarajappa, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/416,882

(22) Filed: Jan. 18, 2024

(65) Prior Publication Data
US 2024/0163197 A1    May 16, 2024

Related U.S. Application Data

(63) Continuation of application No. 17/547,735, filed on Dec. 10, 2021, now Pat. No. 11,929,906.

(Continued)

(51) Int. Cl.
*H04L 45/02* (2022.01)
*H04L 12/46* (2006.01)
(Continued)

(52) U.S. Cl.
CPC .......... *H04L 45/02* (2013.01); *H04L 12/4641* (2013.01); *H04L 12/66* (2013.01); *H04L 45/74* (2013.01)

(58) Field of Classification Search
CPC ..... H04L 45/02; H04L 12/4641; H04L 12/66; H04L 45/74; H04L 12/12; H04L 41/0893; H04L 41/0895; H04L 41/5054
See application file for complete search history.

(56) References Cited

U.S. PATENT DOCUMENTS 6,823,386 B1 * 11/2004 Crump ................ H04L 61/5038
                                                                          709/227
8,380,828 B1 *  2/2013 Schlichter ........... H04L 41/0816
                                                                          709/224

(Continued)

FOREIGN PATENT DOCUMENTS

CN         112769614 A      5/2021

OTHER PUBLICATIONS

The PCT Search Report and Written Opinion mailed Oct. 6, 2022 for PCT application No. PCT/US2022/038529, 44 pages.

(Continued)

*Primary Examiner* — Wutchung Chu
(74) *Attorney, Agent, or Firm* — Lee & Hayes, P.C.

(57) ABSTRACT

Techniques for a head-end node in one or more network autonomous systems to utilize a protocol to instantiate services on tail-end nodes. The head-end node can use a service request mechanism that is enabled by the protocol to request service instantiation on the tail-end node without a network operator having to manually configure the tail-end node, or even having access to the tail-end node. Additionally, the protocol may provide mechanisms to define handling attributes for traffic of the service (e.g., quality of service (QoS) attributes, Maximum Transmission Unit (MTU) settings, etc.), service acknowledgement mechanisms for the head-end node to determine that the service was instantiated on the tail-end node, and so forth. In this way, a head-end node can be used to instantiate a service on (Continued)

a tail-end node without a network operator having to have direct access to the tail-end node to manually configure the tail-end node.

20 Claims, 10 Drawing Sheets

Related U.S. Application Data (60) Provisional application No. 63/226,906, filed on Jul. 29, 2021.

(51) Int. Cl.
*H04L 12/66* (2006.01)
*H04L 45/74* (2022.01)

(56) References Cited

U.S. PATENT DOCUMENTS

| | | | |
|---|---|---|---|
| 8,861,345 B2 | 10/2014 | Hares et al. | |
| 9,021,459 B1* | 4/2015 | Qu | G06F 11/1484 |
| | | | 710/33 |
| 9,106,530 B1* | 8/2015 | Wang | H04L 45/033 |
| 9,118,429 B2* | 8/2015 | Bourakov | H04L 67/04 |
| 9,143,557 B2* | 9/2015 | Guichard | H04L 67/51 |
| 9,614,906 B1* | 4/2017 | Hegde | H04L 41/0668 |
| 9,660,891 B2 | 5/2017 | Marshall | |
| 9,998,247 B1* | 6/2018 | Choudhury | H04J 3/0667 |
| 10,116,467 B2 | 10/2018 | Brissette et al. | |
| 10,135,683 B1 | 11/2018 | Medved et al. | |
| 11,799,929 B1* | 10/2023 | Nandy | H04L 65/65 |
| 11,929,906 B2* | 3/2024 | Brissette | H04L 41/5054 |
| 2003/0117954 A1 | 6/2003 | De Neve et al. | |
| 2003/0135645 A1* | 7/2003 | Oki | H04L 45/12 |
| | | | 709/238 |
| 2003/0156536 A1* | 8/2003 | Oki | H04L 45/70 |
| | | | 370/254 |
| 2006/0206597 A1* | 9/2006 | Kim | H04L 61/5084 |
| | | | 709/220 |
| 2007/0047557 A1* | 3/2007 | Martini | H04L 12/4691 |
| | | | 370/395.53 |
| 2007/0058568 A1* | 3/2007 | Previdi | H04L 45/02 |
| | | | 370/254 |
| 2007/0204002 A1* | 8/2007 | Calderone | G06Q 30/02 |
| | | | 709/217 |
| 2007/0254661 A1* | 11/2007 | Chowdhury | H04W 36/02 |
| | | | 455/436 |
| 2010/0172350 A1* | 7/2010 | Spencer | H04L 45/52 |
| | | | 370/389 |
| 2010/0299414 A1 | 11/2010 | Nyman | |
| 2011/0295978 A1* | 12/2011 | Pazos | H04N 21/26266 |
| | | | 709/219 |
| 2012/0063779 A1* | 3/2012 | Zhang | H04J 14/0256 |
| | | | 398/50 |
| 2012/0087319 A1* | 4/2012 | Raleigh | H04W 48/18 |
| | | | 370/329 |
| 2012/0089845 A1* | 4/2012 | Raleigh | H04L 41/0894 |
| | | | 709/224 |
| 2012/0096513 A1* | 4/2012 | Raleigh | H04W 8/18 |
| | | | 709/224 |
| 2013/0117449 A1 | 5/2013 | Hares et al. | |
| 2013/0166774 A1 | 6/2013 | Pruthi et al. | |
| 2013/0250810 A1* | 9/2013 | Ho | H04L 45/02 |
| | | | 370/255 |
| 2014/0098671 A1* | 4/2014 | Raleigh | G06Q 40/12 |
| | | | 370/235 |
| 2014/0376371 A1 | 12/2014 | Flinck et al. | |
| 2015/0010301 A1* | 1/2015 | Previdi | H04B 10/27 |
| | | | 370/254 |
| 2015/0181415 A1* | 6/2015 | Raleigh | H04M 15/61 |
| | | | 455/418 |
| 2015/0312055 A1 | 10/2015 | Varga et al. | |
| 2015/0341450 A1* | 11/2015 | Reunamaki | H04L 67/52 |
| | | | 705/14.58 |
| 2017/0026288 A1 | 1/2017 | Yang et al. | |
| 2017/0064039 A1* | 3/2017 | Shen | H04L 45/306 |
| 2017/0093834 A1 | 3/2017 | Natu et al. | |
| 2017/0257228 A1* | 9/2017 | Chen | H04L 45/38 |
| 2020/0014623 A1* | 1/2020 | Wang | H04L 45/66 |
| 2020/0220806 A1 | 7/2020 | Gera et al. | |
| 2021/0111999 A1 | 4/2021 | Gandhi et al. | |
| 2021/0160310 A1 | 5/2021 | Azizullah et al. | |
| 2022/0124024 A1* | 4/2022 | Liu | H04L 67/1095 |
| 2022/0132623 A1* | 4/2022 | Xu | H04W 76/10 |
| 2022/0329486 A1* | 10/2022 | Nagaprakash | H04L 43/0811 |
| 2022/0345440 A1* | 10/2022 | Gao | H04L 61/2592 |
| 2022/0393936 A1 | 12/2022 | Chen | |
| 2023/0034314 A1 | 2/2023 | Brissette | |
| 2023/0130720 A1* | 4/2023 | Raleigh | H04M 15/8038 |
| | | | 705/16 |
| 2023/0148236 A1 | 5/2023 | Brissette | |
| 2023/0216775 A1* | 7/2023 | Xu | H04L 45/52 |
| | | | 370/392 |
| 2024/0163197 A1* | 5/2024 | Brissette | H04L 45/74 |

OTHER PUBLICATIONS

Office Action for U.S. Appl. No. 17/547,735, mailed on Aug. 17, 2023, Inventor #1 Patrice Brissette, "Source—Provisioned Services Infrastructure," 16 pages.
PCT Search Report and Written Opinion mailed Mar. 3, 2023 for PCT application No. PCT/US2022/048964, 16 pages.
Stephane Betge-Brezetz et al: "Pro-Active SLA Assurance for Next Generation Network", Mar. 6, 2002 (Mar. 6, 2002), XP055286709, Retrieved from the Internet: URL:http://www-rp.lip6.fr/adanets/PublicDoc/Papers/wtc2002_;Proactive-SLA-Assurance-NGN-020306.pdf [retrieved on Jul. 7, 2016] chapter 2.2, 3 Pages.
Vukovic R et al: "Approach To E2E Service Assurance On the Mobile Internet", Ericsson Review (Incl. On), Telefonaktiebolaget L M Ericsson, SE, No. 3, Jan. 1, 2001 (Jan. 1, 2001), pp. 140-149, XP001081071, ISSN: 0014-0171, 5 Pages.
Office Action for U.S. Appl. No. 17/970,077, Dated Oct. 24, 2024, Brissette, "On-Demand Service Instantiation", 17 pages.
Office Action for European Application No. 22764934.0, Dated Jan. 16, 2025, 9 pages.
Office Action for U.S. Appl. No. 17/970,077 Dated Feb. 10, 2025, Brissette, "On-Demand Service Instantiation," 18 pages.
Rekhter, et al., "A Border Gateway Protocol (BGP-4)", Network Working Group, Jan. 2006, pp. 1-103.

* cited by examiner

SOURCE-PROVISIONED SERVICES INFRASTRUCTURE

CROSS REFERENCE TO RELATED APPLICATIONS

This application claims priority to and is a continuation of U.S. patent application Ser. No. 17/547,735, filed on Dec. 10, 2021, which claims priority to U.S. Provisional Patent Application No. 63/226,906, filed Jul. 29, 2021, the entire contents of which are incorporated herein by reference.

TECHNICAL FIELD

The present disclosure relates generally to mechanisms and techniques for head-end nodes to initiate the provisioning of services on tail-end nodes.

BACKGROUND

An autonomous system (AS) is a large network, or group of networks, that includes network devices that utilize a common routing policy. An AS has a set of Internet Protocol (IP) prefixes that are provided to the network devices in the network(s), and are generally controlled and supervised by a single entity or organization. Various protocols exist for communicating across one or more autonomous systems, such as Virtual Private Wire Service (VPWS), Ethernet Virtual Private Network (EVPN), and so forth.

For example, an EVPN enables users to connect dispersed sites using a Layer 2 (L2) virtual bridge. Generally, an EVPN consists of customer edge (CE) devices (e.g., hosts/servers, routers, switches, etc.) connected to provider edge (PE) routers. In some examples the PE routers can include a multiprotocol label switching (MPLS) edge switch that acts at the edge of an MPLS infrastructure. Further, VPWS L2 VPNs employ L2 services over MPLS to build a topology of point-to-point connections that connect end customer sites in a VPN. The service provisioned with these Layer 2 VPNs is known as VPWS. You can configure a VPWS instance on each associated edge device for each VPWS Layer 2 VPN.

An EVPN-VPWS network provides a framework for delivering VPWS with EVPN signaling mechanisms. The advantages of VPWS with EVPN mechanisms are single-active or all-active multihoming capabilities and support for Inter-autonomous system (AS) options associated with Border Gateway Protocol (BGP)-signaled VPNs.

Traditionally, in order to configure services (e.g., VPWS instances) on devices, such as edge devices (e.g., routers), network operators have to access each edge device and instantiate the services on the edge devices. However, having to manually configure each device is cumbersome and error prone. Further, network operators often do not have direct access to edge devices, such as when the edge devices reside in a different network AS, and the network operators are unable to provision a new service on those edge devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes techniques for a first router to utilize messaging in a protocol to provide instantiation information to a second router to instantiate a service on the second router.

A first method to perform the techniques described herein may include receiving, at the first router, input from a network operator that causes the service to be instantiated on the first router. In the first method, the first router generates an advertisement message indicating the service that is instantiated on the first router and a path associated with reaching the service on the first router, and populates the advertisement message with a service request attribute that includes information for enabling the service on the second router. Generally, the information may include a service identifier that indicates the service that is being requested to be enabled on the second router, and service-location information indicating a location at which the second router enables the service. Further, the first method may include sending, from the first router, the advertisement message that includes the service request attribute to the second router.

A second method to perform the techniques described herein may include techniques for a tail-end router to instantiate a service using instantiation information provided from a head-end router. The second method may include receiving, at the tail-end router, an advertisement message from a head-end router. Generally, the advertisement message may include an indication of a path associated with reaching a service that is instantiated on the head-end router, a service request attribute including a request that the tail-end router instantiate the service. The second method may further include instantiating the service on the tail-end router based at least in part on the request. In some instances, optionally, the second method may further include sending, from the tail-end router, an acknowledgement message to the head-end router, the acknowledgment message including the measurement information.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for a head-end node in one or more network autonomous systems to utilize a protocol, such as a Border Gateway Protocol (BGP), for signaling of services and instantiation of services on tail-end nodes. For instance, the head-end node can use a service request mechanism that is enabled by the protocol to request service instantiation on a tail-end node without a network operator having to manually configure the tail-end node, or even having configuration access to the tail-end node. In addition to the service request mechanism, the protocol may further provide mechanisms to define handling attributes for traffic of the service (e.g., quality of service (QoS) attributes, Maximum Transmission Unit (MTU) settings, etc.), service acknowledgement mechanisms for the head-end node to determine that the service was instantiated on the tail-end node, and so forth. In this way, a head-end node can be used to instantiate a service on a tail-end node without a network operator having to have direct access to the tail-end node to manually configure the tail-end node.

As noted above, it is cumbersome and error-prone for network operators to manually instantiate nodes, such as PE routers, with new services. Rather than network operators performing these operations, or requiring a network controller and protocol, the techniques described herein utilize a routing protocol to provide on-demand connectivity that is source provisioned.

Any routing protocol can be used to perform the techniques described herein. However, it may be advantageous to utilize BGP to source-provision new services on tail-end nodes due to its support of inter-AS environments, and its ability to extend support to EVPN services. Even further, EVPN and L3 services are also driven or enabled by the BGP protocol. A network operator may have direct access to a head-end node and is able to configure or instantiate a new service on the head-end node. The head-end node may then utilize the routing protocol to push meaningful information to the tail-end node about the instantiation of a new service. In this way, the tail-end node may be instantiated with the new service without the network operator having to manually instantiate the service or even have access to the tail-end node.

As noted above, BGP may be utilized as the routing protocol to push the instantiation information to the tail-end node. Generally, when a service is configured on a router, EVPN uses BGP auto-discovery to advertise appropriate routes to tell remote PE routers about the new available service along with reachability information. BGP route advertisements may be limited to a subset of remote PE routers when the advertisements are sent using BGP extended communities such as route-target, route policy, and so forth. When remote PE routers receive the EVPN routes (e.g., tail-end routers), the remote PE routers may use this information to enable the service based on local configuration. In the case of VPWS services, EVPN per-EVPN instance (EVI)-Ethernet Auto Discovery Route (EAD) is used to announce the reachability of the new service.

Along with the route advertisements, a new optional BGP path transitional attribute may be used to request that the remote PE routers install, enable, instantiate, etc., the service. The new attribute may be a BGP Service Request attribute and defined to be a set of elements encoded as a TLV-based format. The service request TLV may include various information, such as a request identifier (ID) that is used for handling repeated requests, a service (ID) that is used to identify the service to instantiate, a Media Access Control (MAC) address indicating a port where the remote PE router is onboarded, virtual local area network (VLAN) tags that are used to onboard the remote PE router, and so forth. The service request TLV may then be used by the remote PE routers to instantiate the requested service thereon.

In some examples, additional TLVs may be included in the BGP service request attribute, such as a service attribute TLV. The service attribute TLV may include attributes to use for the service once instantiated, such as a quality-of-service (QoS) indicating how much bandwidth is allowed or allocated on the service, a maximum transmission unit (MTU) setting that defines the largest packet size that can be transmitted by the service to avoid fragmentation or dropped packets, and so forth.

Even further, additional TLVs may be included in the BGP service request attribute, such as a service measurement TLV. The service measurement TLV may include a request for information usable for operations, administration, and management (OAM). For instance, the service measurement TLV may include a request for timestamp data that is usable to measure the round-trip delay between the service request and a service acknowledgement sent from the remote PE routers.

While the techniques below are often described with reference to MPLS and/or Segment routing (SR), the techniques are equally applicable for underlay and transport protocol such as SR version 6 (SRv6), Virtual extensible LAN (VxKLAN) etc. Further, the techniques are appliable for various IP tunnels such as Generic UDP Encapsulation (GUE), MPLS-over-UDP (MPLSoUDP), Generic Routing Encapsulation (GRE), Generic Protocol Extension (GPE), Point-to-Point Protocol over Ethernet (PPPoE), and so forth. Additionally, while the techniques described herein are with reference to VPWS, the techniques around BGP are equally applicable in terms of address-family for L2 bridging services and L3VPN services.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
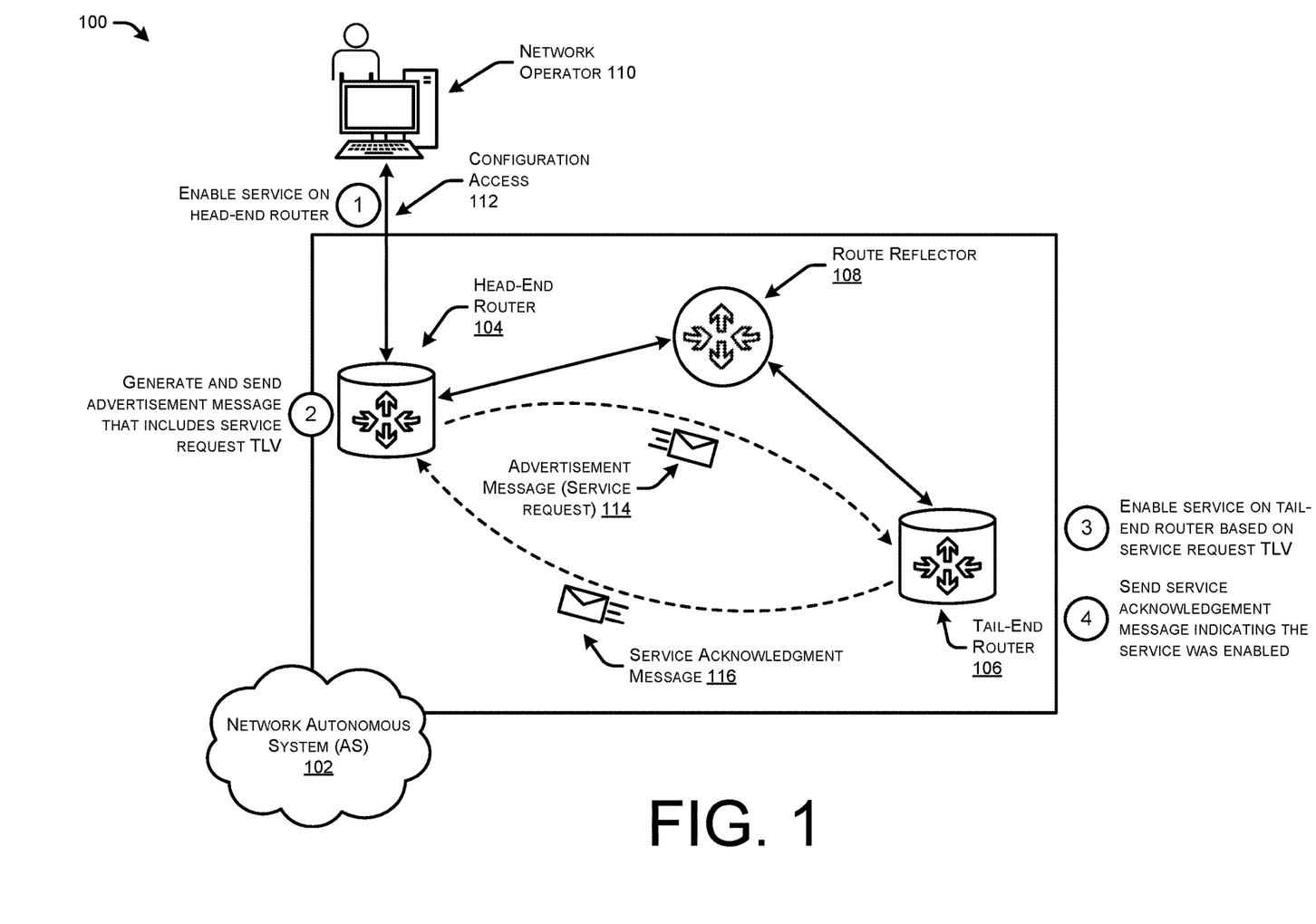
FIG. 1 illustrates a system-architecture diagram of an example network autonomous system (AS) where a network operator configures a head-end router with a service, and the head-end router uses a protocol to send a message to enable the service on a tail-end router.

FIG. 1 illustrates a system-architecture diagram 100 of an example network autonomous system (AS) 102 where a network operator configures a head-end router 104 with a service, and the head-end router 104 uses a protocol to send a message to enable the service on a tail-end router 106.

The network AS 102 is a large network, or group of networks, that includes network devices that utilize a common routing policy. The network AS 102 has a set of IP prefixes that are provided to the network devices in the network(s), and are generally controlled and supervised by a single entity or organization. Various protocols exist for communicating across one or more autonomous systems, such as VPWS, EVPN, and so forth. In some examples, the network AS 102 may be a MPLS network that switches packets using labels rather than IP addresses or layer 3 information, an IP network that communicates packets using unique IP addresses, and so forth. In various examples, the network AS 102 may be an MPLS/IP network where an IP packet is encapsulated within a packet with a header label (e.g., label switching).

As illustrated, a network operator 110 may, at "1", enable and/or provision a service on the head-end router 104. In some instances, the head-end router 104 is a PE router that is located at an edge of a provider network and is connected to a customer edge router that is located at customer premises. The service may be any type of service, such as a VPWS L2 service between two customers connected via two PE routers (104 and 106). The network operator 110 has configuration access 112 to the head-end router, but not the tail-end router 106 in some examples. In other examples, it may be time consuming and error prone for the network operator 110 to gain access and configure ever PE router with a service. Thus, it is advantageous for the network operator 110 to enable the far end circuit on tail-end router 106 using his configuration access 112 to head-end router 104 and via one or more protocols. That is, the network operator 110 wants the capability to inform the tail-end router 106 about the new services provisioning, its enablement, and its application.

To help accomplish this, the head-end router 104 may advertise the service using BGP auto-discovery (and/or another protocol). Once the service is configured on the head-end router 104, appropriate routes for the service are advertised in BGP telling remote PE routers (e.g., tail-end router 106) about a new available service along with reachability information. BGP routes advertisement can be limited to a subset of remote PE. Techniques like route-target, route policy, etc., may be used.

While any routing protocol can be used to perform the techniques described herein, it may be advantageous to utilize BGP to source-provision new services on tail-end routers 106 due to its support of inter-AS environments, and its ability to extend support to EVPN services. Even further, EVPN and L3 services are also driven or enabled by the BGP protocol. After the network operator 110 uses direct configuration access 112 to configure or instantiate the new service on the head-end router 104, the head-end router 104 may then utilize the routing protocol to push meaningful information to the tail-end router 106 about the instantiation of the new service.

As noted above, BGP may be utilized as the routing protocol to push the instantiation information to the tail-end node. Generally, when a service is configured on a router, EVPN uses BGP auto-discovery to advertise appropriate routes to tell remote PE routers about the new available service along with reachability information. BGP route advertisements may be limited to a subset of remote PE routers when the advertisements are sent using BGP extended communities such as route-target, route policy, and so forth. When remote PE routers receive the EVPN routes (e.g., tail-end routers 106), the remote PE routers may use this information to enable the service based on local configuration. In the case of VPWS services, EVPN per-EVPN instance (EVI)-Ethernet Auto Discovery Route (EAD) is used to announce the reachability of the new service.

At "2," the head-end router 104 may generate and send an advertisement message 114 that includes a service request attribute. Along with the route advertisement(s) 114, a new optional BGP path transitional attribute may be used to request that the tail-end router(s) 106 install, enable, instantiate, etc., the service. The new attribute may be a BGP Service Request attribute and defined to be a set of elements encoded as a TLV-based format. The service request TLV may include various information, such as a request ID that is used for handling repeated requests, a service ID that is used to identify the service to instantiate, a MAC address indicating a port where the tail-end router(s) 106 is onboarded, ULAN tags that are used to onboard the remote PE router, and so forth. The service request TLV may then be used by the tail-end router(s) 106 to instantiate the requested service thereon.

In some examples, additional TLVs may be included in the BGP service request attribute, such as a service attribute TLV. The service attribute TLV may include attributes to use for the service once instantiated, such as a quality-of-service (QoS) indicating how much bandwidth is allowed or allocated on the service, a maximum transmission unit (MTU) setting that defines the largest packet size that can be transmitted by the service to avoid fragmentation or dropped packets, and so forth.

Even further, additional TLVs may be included in the BGP service request attribute, such as a service measurement TLV. The service measurement TLV may include a request for information usable for operations, administration, and management (OAM). For instance, the service measurement TLV may include a request for timestamp data that is usable to measure the round-trip delay between the service request and a service acknowledgement sent from the remote PE routers.

At "3," the tail-end router 106 may enable the service based on the service request TLV included in the advertisement message 114. For instance, the tail-end router 106 may obtain service configuration information from a location at which the service can be obtained, where the location is indicated in the service request of the advertisement message 114. After instantiating the service on the tail-end router 106, the tail-end router 106 may then generate and send an acknowledgement message 116 indicating that the service was enabled.

Generally, the autonomous system (AS) 102 may be any type of network that has a collection of connected IP routing prefixes under the control of one or more operators of administrative entities. The AS 102 may utilize a common and clearly defined routing policy to the Internet. An Internet Service Provider (ISP) is an example of an AS 102. The AS 102 may include one or more networks implemented by any viable communication technology, such as wired and/or wireless modalities and/or technologies. The distributed application as 102 may each may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The AS 102 may include devices, virtual resources, or other nodes that relay packets from one network segment to another by nodes in the computer network. Although described as head-end routers 104 and tail-end routers 106, the routers 104/106 may be and type of PE or CE router, as well as any other type of networking node on which services may be instantiated according to the techniques described herein.

Figure 2:
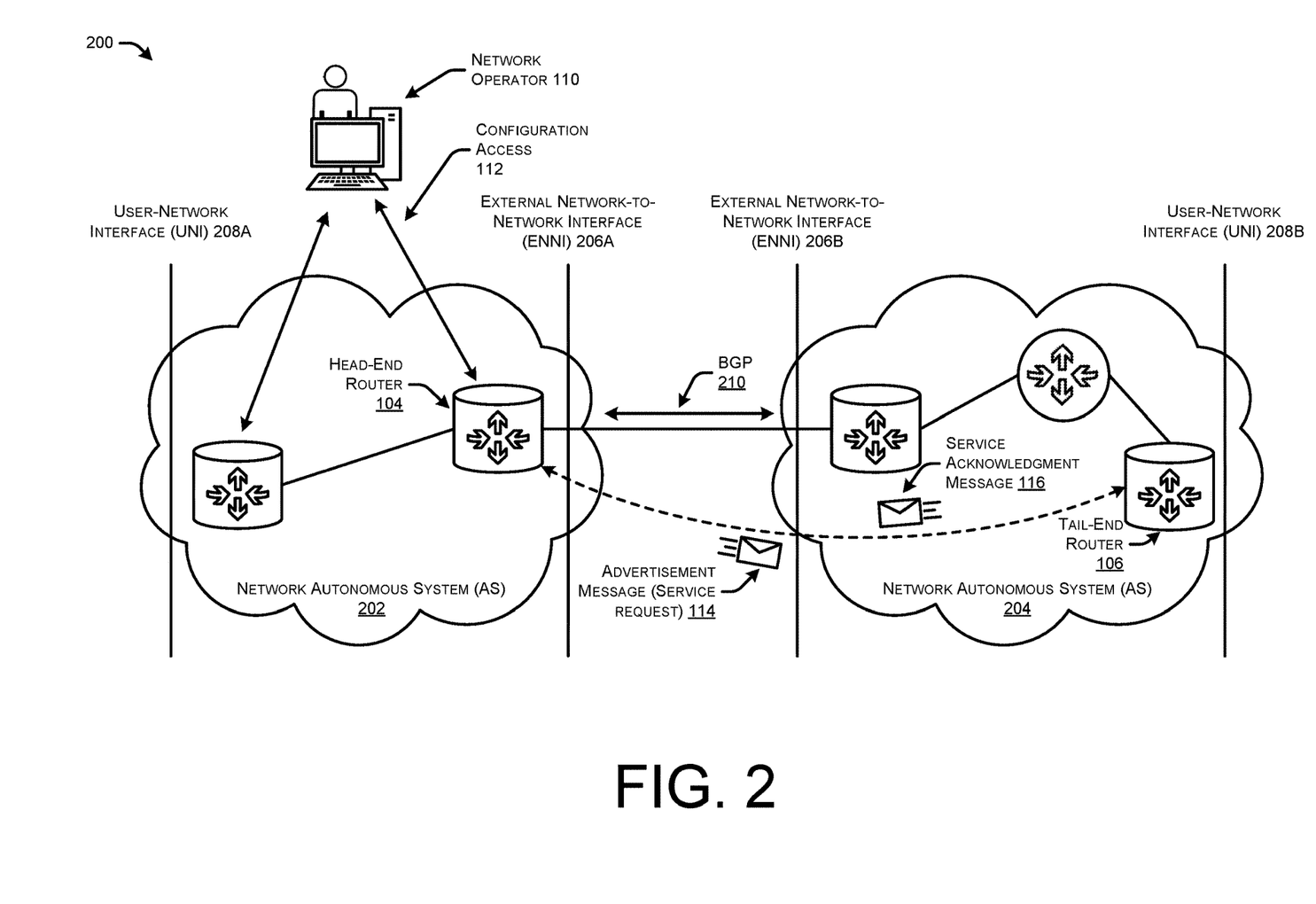
FIG. 2 illustrates a system-architecture diagram of an example network with multiple autonomous systems where a network operator configures a head-end router with a service, and the head-end router uses a protocol (such as Border Gateway Protocol (BGP)) to send a message to enable the service on a tail-end router.

FIG. 2 illustrates a system-architecture diagram of an example network with multiple autonomous systems where a network operator configures a head-end router with a service, and the head-end router uses a protocol (such as Border Gateway Protocol (BGP)) to send a message to enable the service on a tail-end router. Insofar as numbering is similar to that of FIG. 1, the operations of FIG. 1 are also applicable in FIG. 2.

FIG. 2 illustrates an inter-AS link between 2 different networks network AS 202 and network AS 204. Each network AS 202 and 204 may have one or more user-network interfaces (UNIs) 208A and 208B that illustrate the physical demarcation points between the responsibilities of the subscriber (e.g., the Customer Edge or CE) and the responsibility of the Service Provider. Similarly, the ach network AS 202 and 204 may have one or more external network-to-network interfaces (ENNIs) 206 and 206B that illustrate demarcation points representing the boundaries between two operator networks AS 202 and AS 204) that are operated as separate administrative domains.

In this example, the network operator 110 has unique configuration access to head-end router 104 and other routers in the network AS 202. The network operator 110 may desire to provide a service connectivity with the tail-end router 106 where a new configuration is pushed remotely. While providing the request remotely from the head-end router 104, the operator 110 may assign ingress and egress attributes to the tail-end circuit, such as QOS policies, MTU, etc. The network. AS 202 may also be connected to many other networks via different ENNI-ENNI links.

Generally, the network operator 110 may know a set of rules and info nation related to the tail-end network to onboard. Information can be the network AS 204 information, tail-end router 106 ID, interface name, ULAN ID, etc. As illustrated, the head-end router 104 may utilize a BGP 210 connection to send the advertisement message 114 that includes the service request attribute. The tail-end router 106 may then instantiate the service using the information included in the service request and send a service acknowledgement message 116 to the head-end router 104 and/or a different device that the network operator 110 has access.

In order to onboard a tail-end device 106 as described in FIGS. 1 and 2, a network operator 110 may need to have various information associated with the tail-end device 106. For instance, the network operator 110 may need information such as a BGP ASN number, a BGP EVPN VRF indicated by either an EVPN instance or a set of BGP route targets, service identification (e.g., a "pseudowire ID", a known template pre-configured on tail-end router 106, etc.), the chassis ID (e.g., an IP address specifying the router ID where the device is connected, a port identification where the device to onboard is connected (e.g., a port MAC address, port name, port ID, etc.), an Ethernet tag used to onboard the device (e.g., a single-tag or double-tag VID), and/or any attributes related to service level agreement (e.g. bandwidth, MTU, etc.). This information may be used to send the service request/advertisement message 114 to the tail-end router, and may be included in the service request 114.

Figure 3:
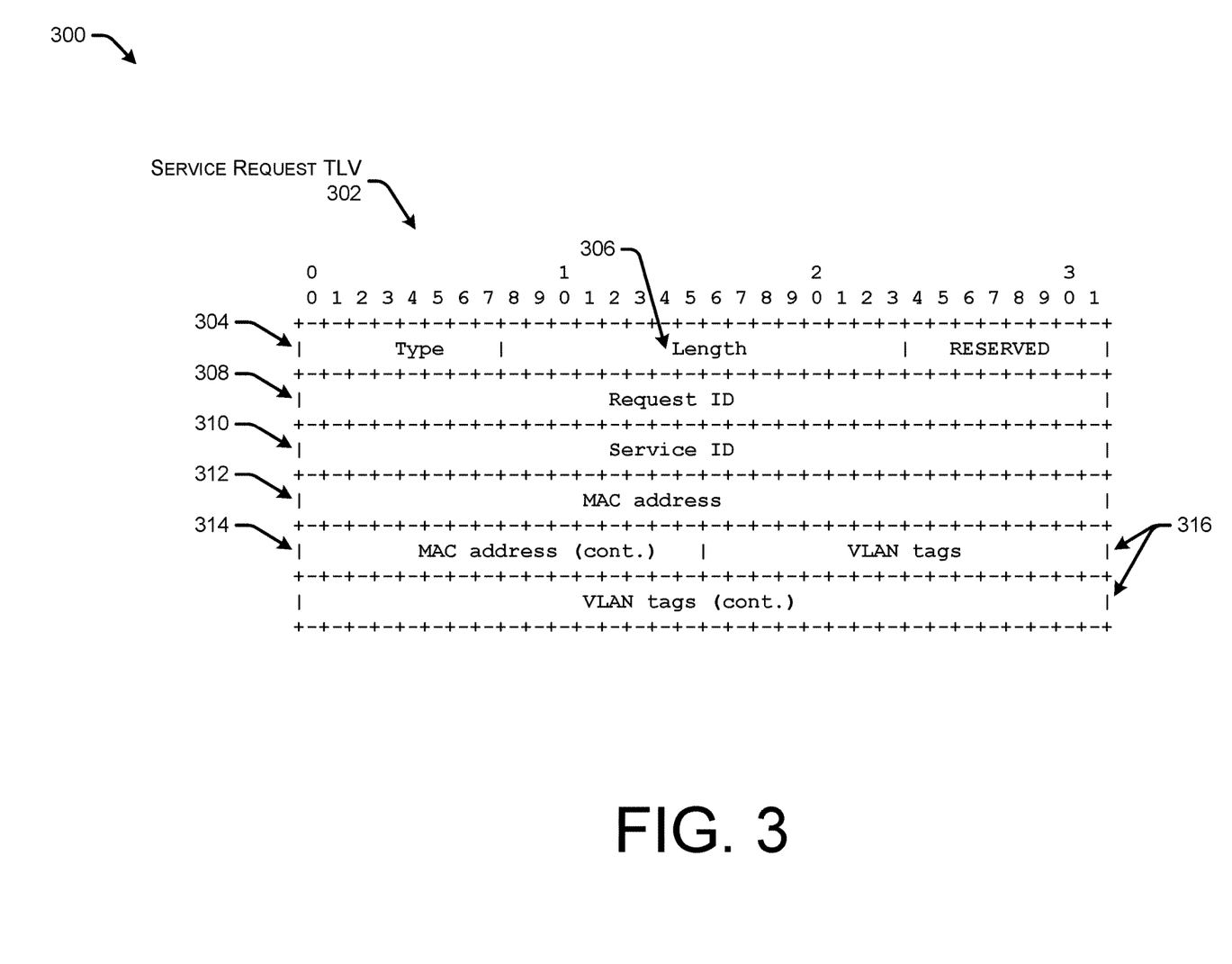
FIG. 3 illustrates an example diagram of a service request Type-Length-Value (TLV) for a BGP message that provides information for a tail-end router to instantiate a service.

FIG. 3 illustrates an example diagram 300 of a service request Type-Length-Value (TLV) for a BGP message that provides information for a tail-end router to instantiate a service.

In the case of VPWS services, EVPN per-EVI EAD route is used to announce the reachability of a new service. Along with that route, a new BGP path transitional attribute is defined, a portion of which is illustrated in FIG. 3, called the BGP-Service-Request attribute. The BGP-Service-Request attribute is defined to be a set of elements encoded as a TLV based format. The service request TLV may be present in BGP-Service-Request attribute attached to EVPN type-1 per EVI/EAD NLRI and an example format is shown in FIG. 3.

Generally, the service request TLV 302 may have a type of "1," a length 306 of "X" that is the total length in bytes of the value portion of the TLV. The service request TLV 302 may include a request ID 308 that may be a 4-byte value provided by the head-end router 104. The request ID 308 may serve multiple purposes, such as handling repeated request. The service request TLV 302 may further include a service ID 310 that may be a 4 bytes value identifying the service to instantiate. In the case of VPWS, the service ID 310 may be the equivalent of Ethernet tag ID. The usage of service ID 310 may refer to a specific template ID describing the service to instantiate and that is known by tail-end router 106. The service request. TLV may further include the MAC address 312 of the port where a user of the device is onboarded, as well as one or more VLAN tags 316, which may be an Ethernet TAG value to enable to the onboard router 106, which may be a singled-tag or double-tag VII).

Figure 4:
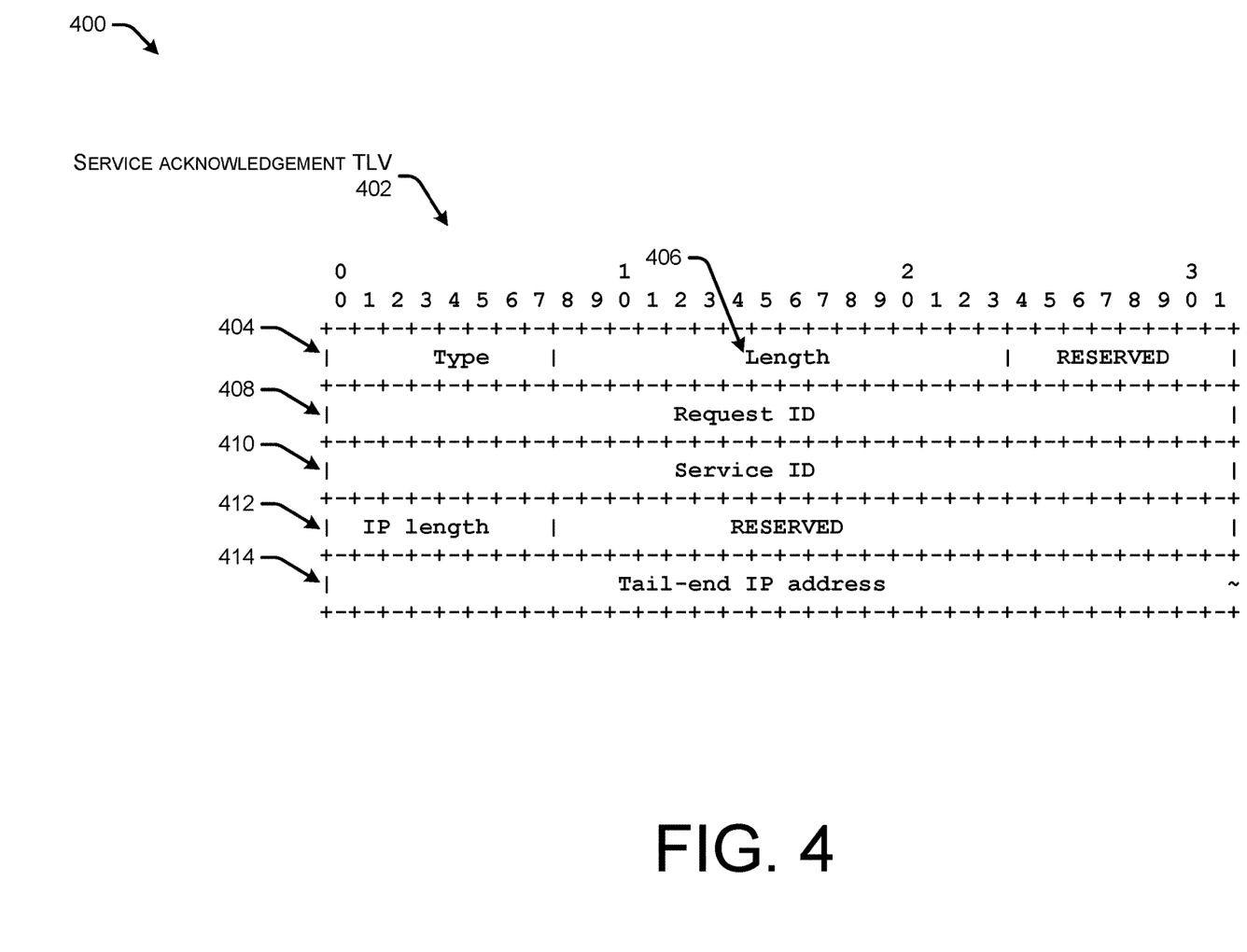
FIG. 4 illustrates an example diagram of a service acknowledgement TLV for a BGP message that a tail-end router can send to the head-end router.

FIG. 4 illustrates an example diagram 400 of a service acknowledgement TLV 402 for a BGP message that a tail-end router can send to the head-end router. The service acknowledgement TLV 402 may be present in BGP-Service-Request attribute attached to EVPN type-1 per EVI/EAD NLRI and has an example format shown in FIG. 4 (which may be a different format in some examples). The type 404 may be "2," and the length 406 may be "X" where "X" is the total length in bytes of the value portion of the TLV 402. Further, the service acknowledgement TLV 402 may include a request ID 408 that may be a 4-byte value provided by the head-end router 104 in the Service Request TLV, and a service ID 410 which may be a 4 byte value identifying the service enabled by the tail-end router 106. The service acknowledgment TLV 402 may further include an IP length 412 that is the length of the Tail-end route 106 IP address (e.g., IPv6, IPv4, etc.), Additionally, the service acknowledgment TLV 402 may include a tail-end IP address 414 that is the actual IPv4 or IPv6 address of the tail-end router 106 where the service has been instantiated.

Figure 5:
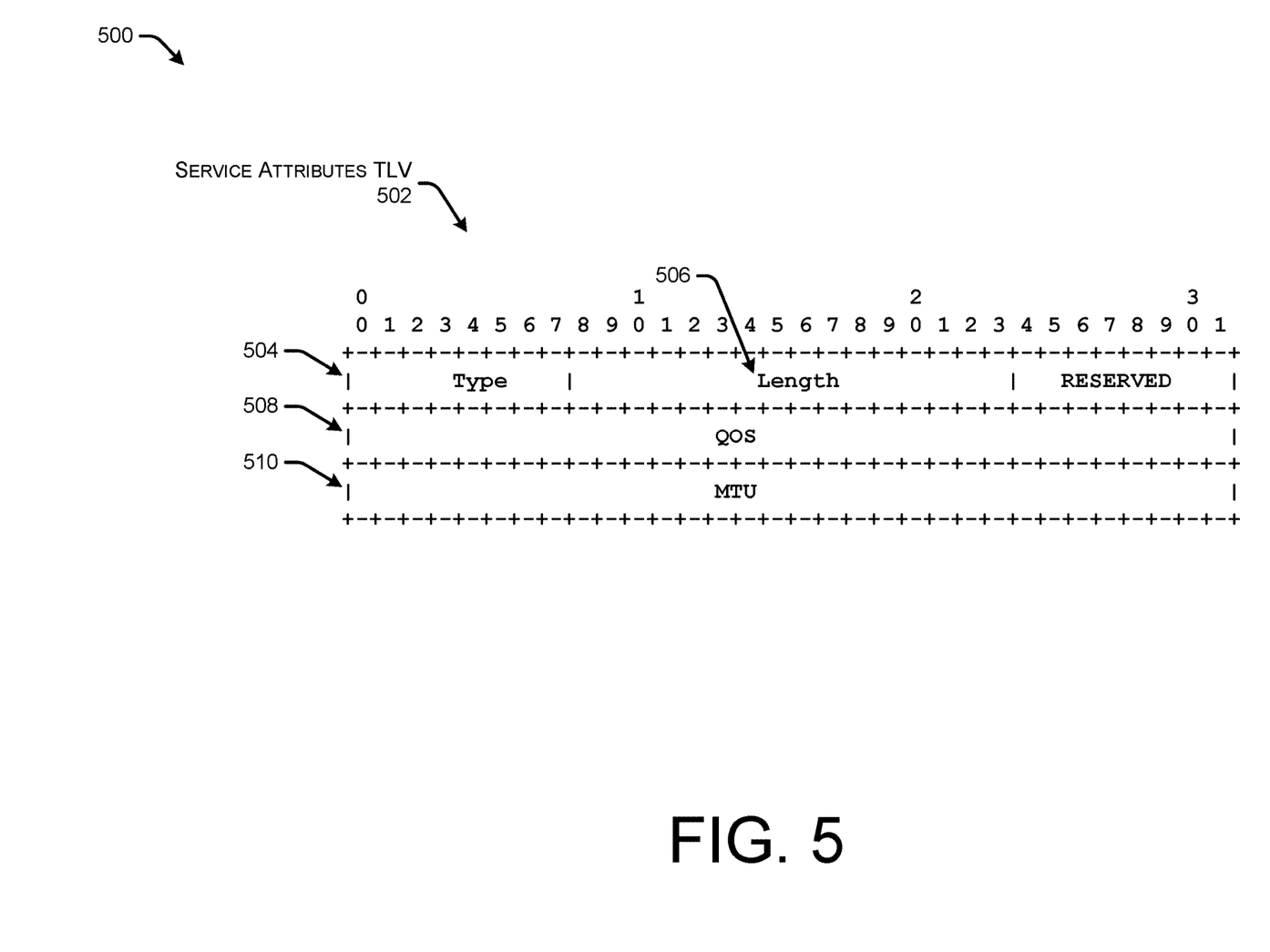
FIG. 5 illustrates an example diagram of a service attributes TLV for a BGP message that indicates handling parameters for traffic communicated by the service on the tail-end router.

FIG. 5 illustrates an example diagram 500 of a service attributes TLV for a BGP message that indicates handling parameters for traffic communicated by the service on the tail-end router.

The service attributes TLV 502 may be present in BGP-Service-Request attribute attached to EVPN type-1 per EVI/EAD NLRI and has an example format as shown in FIG. 5 (other formats may be used). The format can be extended or modified. The services attributes TLV may be extended or modified based on network operator 110 requirements. The type 504 may be "3," and the length may be "X" which indicates the total length in bytes of the value portion of the service attributes TLV 502, The service attributes TLV 502 may include a QoS field 508 that indicates QoS metrics for the service, such as an amount of bandwidth that is allowed on the service. Further, the service attributes TLV 502 may include an MTU setting 510 that defines the largest packet size that can be transmitted by the service to avoid fragmentation or dropped packets, and so forth.

Although not illustrated, the service attributes TLV 502 may be expanded to include additional attributes, such as VLAN action/rewrites such as push, pop, swap action, segment routing ODN parameters, use of predefined Ethernet source and destination MAC address, etc. Similarly, the list in the service attributes TLV 502 can be enhanced with Layer 3 or multicast specific attributes, FIG. 6 illustrates an example diagram 600 of a service measurement TLV 602 for a BGP message indicating metrics that are to be collected by a tail-end router that instantiated a service.

Figure 6:
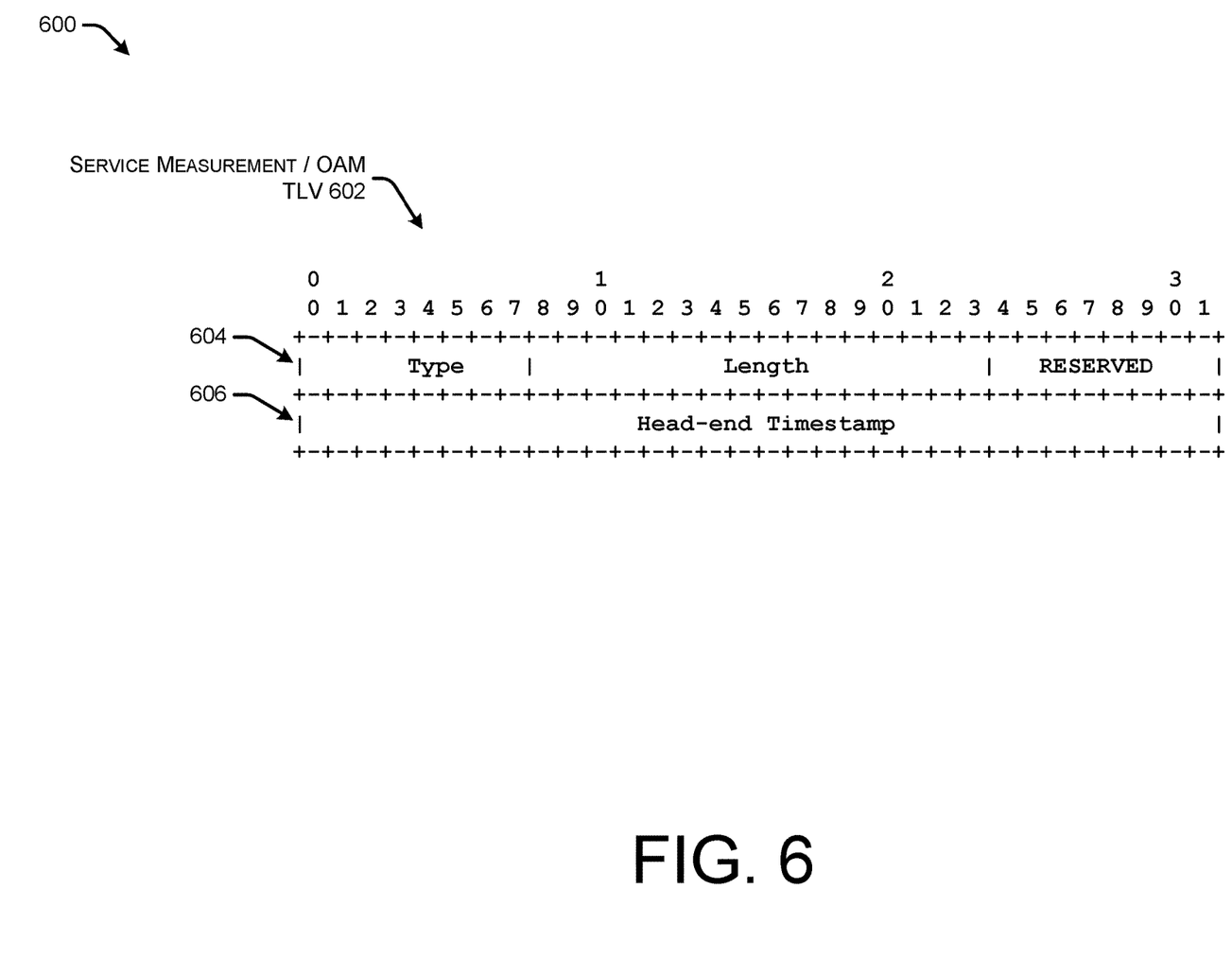
FIG. 6 illustrates an example diagram of a service measurement TLV for a BGP message indicating metrics that are to be collected by a tail-end router that instantiated a service.

The service measurement TLV 602 may be present in BGP-Service-Request attribute attached to EVPN type-1 per EVI/EAD NLRI and has a format similar to that shown in FIG. 6, but it may be modified or different in some examples. The format may also be extended or modified. The type 604 may be type "4," and the service measurement TLV 602 may include a head-end time stamp field 606. The head-end timestamp 606 may be 4 bytes value provided by head-end router 104, and the purpose is to measure the round-trip delay (request/acknowledgment). The network operator 110 can then determine how long it took to instantiate and enable the new service on the tail-end router 106.

Figure 7:
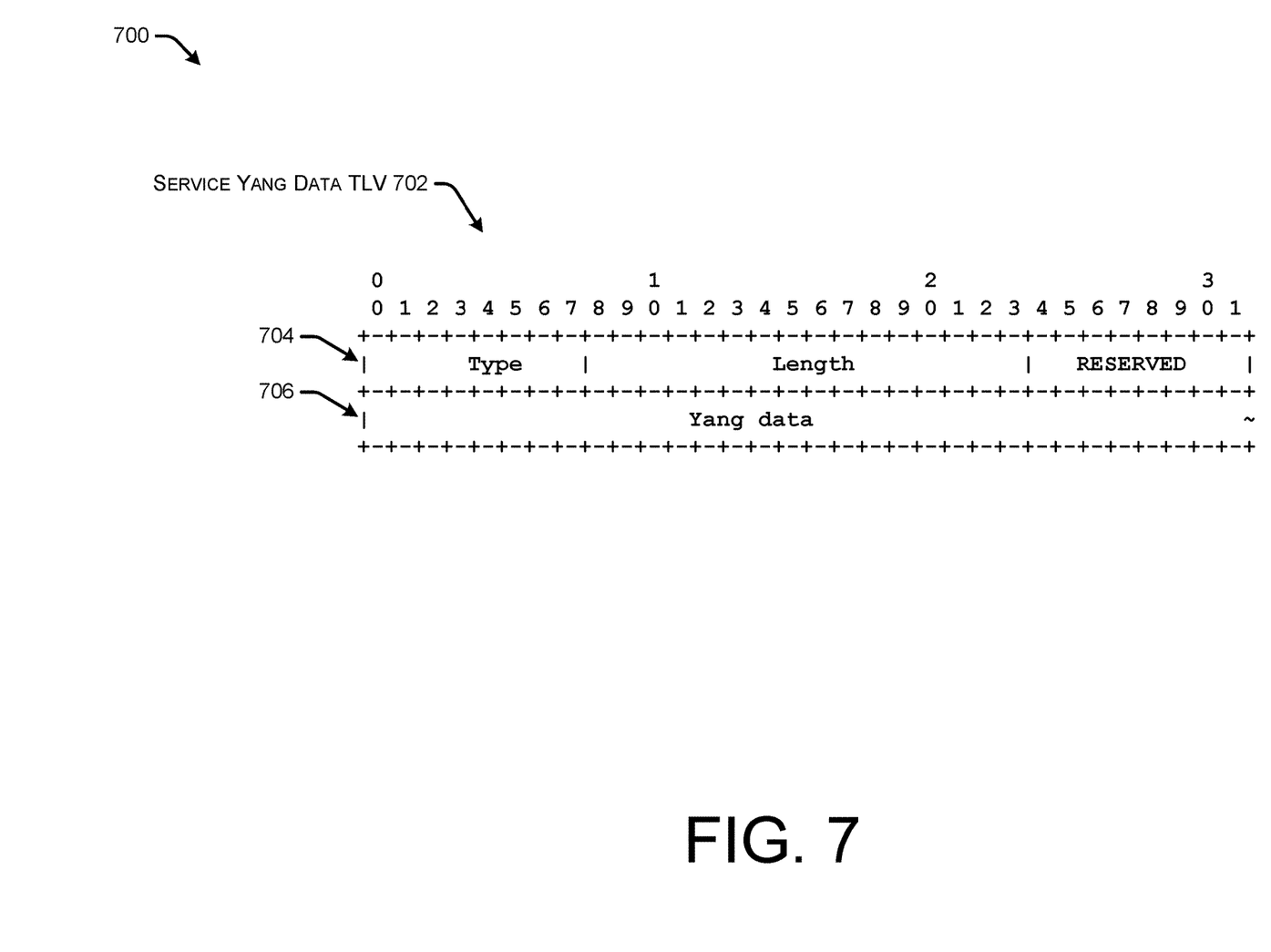
FIG. 7 illustrates an example diagram of a service Yang data TLV for a BGP message that may include Yang data for a tail-end router that instantiates a service.

FIG. 7 illustrates an example diagram 700 of a service Yang data TLV 702 for a BGP message that may include Yang data for a tail-end router that instantiates a service.

The service Yang data TLV 702 may be present in BGP-Service-Request attribute attached to EVPN type-1 per EVI/EAD NLRI and has a format as shown in FIG. 7, but the format can be extended or modified in some examples. The service Yang data TLV 702 may have a type 704 of "5," and include Yang data which may be a string value carrying a Yang data model. The service Yang data TLV 702 provides a flexible way to the network operator 110 to provide direct request using Yang data model as if the request is coming through Netconf/Yang API from a controller.

Figure 8:
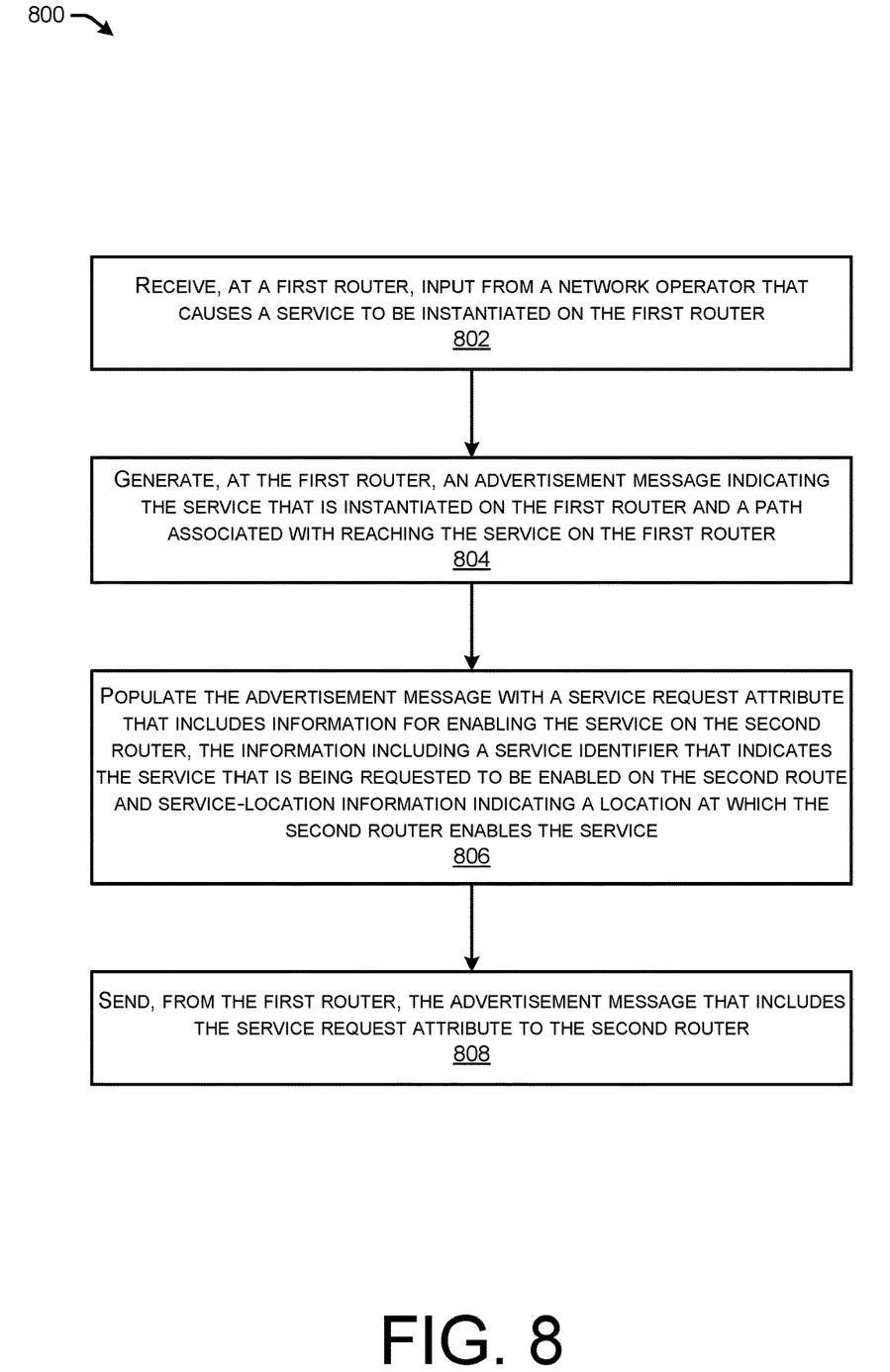
FIG. 8 illustrates a flow diagram of an example method for a head-end router to utilize a protocol to provide instantiation information to a tail-end router that is usable to instantiate a service on the tail-end router.
Figure 9:
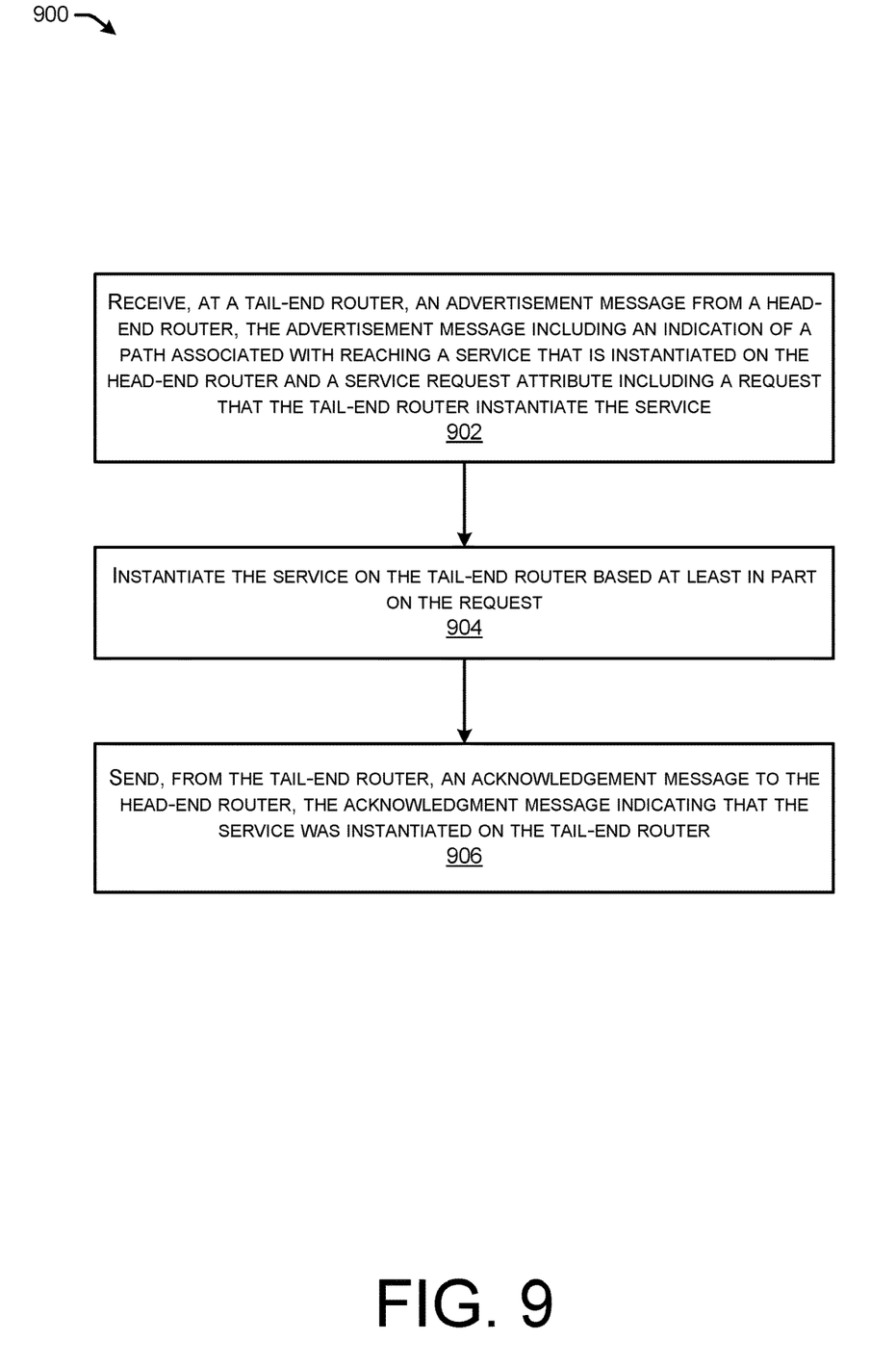
FIG. 9 illustrates a flow diagram of an example method for a tail-end router to instantiate a service using instantiation information provided from a head-end router.

FIGS. 8 and 9 illustrate flow diagrams of example methods 800 and 900 that illustrate aspects of the functions performed at least partly by the devices in the distributed application architecture as described in FIGS. 1-7. The logical operations described herein with respect to FIGS. 8 and 9 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 8 and 9 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 8 illustrates a flow diagram of an example method 800 for a head-end router 104 to utilize a protocol to provide instantiation information to a tail-end router 106 that is usable to instantiate a service on the tail-end router 106. The method may be for a first router (e.g., head-end router 104) to utilize a protocol (e.g., BGP or another routing protocol) to provide instantiation information to a second router (e.g., tail-end router 106) that is usable to instantiate a service on the second router.

At 802, the first router may receive input from a network operator that causes the service to be instantiated on the first router. For instance, the network operator 110 may provide configuration information to the first router that causes the first router to be enabled with a service.

At 804, the first router may generate an advertisement message indicating the service that is instantiated on the first router and a path associated with reaching the service on the first router. For instance, the head-end router 104 may generate an advertisement message 114 that indicates that the service was instantiated and one or more paths for reaching the service instantiated on the head-end router 104.

At 806, the first router may populate the advertisement message with a service request attribute that includes information for enabling the service on the second router. For instance, the head-end router 104 may populate the advertisement message 114 with information that the tail-end router 106 may use to instantiate the service. In some instances, the information may include a service identifier that indicates the service that is being requested to be enabled on the second router, and service-location information indicating a location at which the second router enables the service.

At 808, the first router may send the advertisement message that includes the service request attribute to the second router. For instance, the head-end router 104 may send the advertisement message 114 to the tail-end router 106 that enables the service on the tail-end router 106.

FIG. 9 illustrates a flow diagram of an example method 900 for a tail-end router to instantiate a service using instantiation information provided from a head-end router.

At 902, the tail-end router 106 may receive an advertisement message from a head-end router. In some instances, the advertisement message may include an indication of a path associated with reaching a service that is instantiated on the head-end router, and a service request attribute including a request that the tail-end router instantiate the service.

At 904, the tail-end router 106 may instantiate the service based at least in part on the request. At 906, the tail-end router 106 may send an acknowledgement message to the head-end router, the acknowledgment message indicating that the service was instantiated on the tail-end router.

Figure 10:
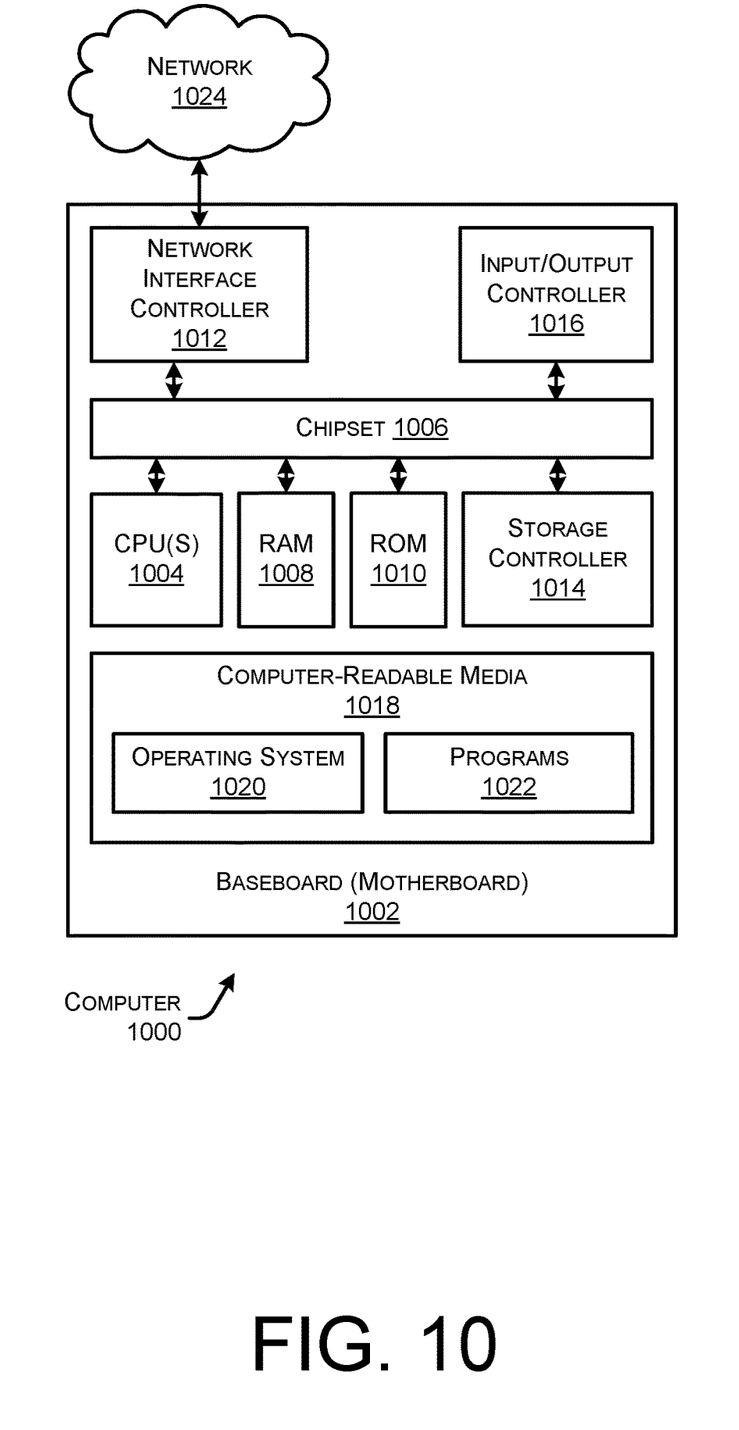
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a conventional router, switch, node, or other computing device, and can be utilized to execute any of the software components presented herein. The computer 1000 may, in some examples, correspond to a head-end router 104, a tail-end router 106, and/or another device described herein, and may comprise networked devices such as servers, switches, routers, hubs, bridges, gateways, modems, repeaters, access points, etc.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 1024. The chipset 1006 can include functionality for providing network connectivity through a NIC 1012, such as a gigabit Ethernet adapter. The NIC 1012 is capable of connecting the computer 1000 to other computing devices over the network 1024. It should be appreciated that multiple NICs 1012 can be present in the computer 1000, connecting the computer to other types of networks and remote computer systems.

The computer 1000 can be connected to a storage device 1018 that provides non-volatile storage for the computer. The storage device 1018 can store an operating system 1020, programs 1022, and data, which have been described in greater detail herein. The storage device 1018 can be connected to the computer 1000 through a storage controller 1014 connected to the chipset 1006. The storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1018 is characterized as primary or secondary storage, and the like.

For example, the computer 1000 can store information to the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by devices such as the head-end router 104, tail-end router 106, and so forth, and or any components included therein, may be supported by one or more devices similar to computer 1000. Stated otherwise, some or all of the operations performed by the head-end router 104, tail-end router 106, and or any components included therein, may be performed by one or more computer devices 1000.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1018 can store an operating system 1020 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1018 can store other system or application programs and data utilized by the computer 1000.

In one embodiment, the storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1-9. The computer 1000 can also include computer-readable storage media having instructions stored thereupon for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device.

As described herein, the computer 1000 may comprise one or more of a head-end router 104, tail-end router 106, and/or other device. The computer 1000 may include one or more hardware processors 1004 (processors) configured to execute one or more stored instructions. The processor(s) 1004 may comprise one or more cores. Further, the computer 1000 may include one or more network interfaces configured to provide communications between the computer 1000 and other devices, such as the communications described herein as being performed by the head-end router 104 and/or tail-end router 106. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 1022 may comprise any type of programs or processes to perform the techniques described in this disclosure by the head-end router 104 and/or tail-end router 106.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for a first router to utilize a protocol to provide information to a second router that is usable to install a service on the second router, the method comprising:
   generating, at the first router, an advertisement message indicating a service that is installed on the first router and configures the first router to establish network paths with other devices that have the service installed;
   populating the advertisement message with a service request Type-Length-Value (TLV), the service request TLV including the information for installing the service on the second router, the information including at least one of:
      a service identifier that identifies the service that is being requested to be installed on the second router; or
      service-location information indicating a location at which the second router installs the service,
   wherein the service configures the first router and second router to establish a network path; and
   sending, from the first router, the advertisement message to the second router such that the second router installs the service and is configured to establish the network path with the first router.

2. The method of claim 1, wherein the service-location information includes:
   a Media Access Control (MAC) address associated with onboarding the second router with the service; and
   an indication of a Virtual Local Area Network (VLAN) over which the second router is onboarded with the service.

3. The method of claim 1, further comprising:
   populating the advertisement message with a service-acknowledgement TLV, the service-acknowledgement TLV comprising:
      a service identifier that indicates that the service was installed on the second router; and
      an Internet Protocol (IP) address associated with the second router.

4. The method of claim 3, further comprising:
   installing the service on the second router; and
   sending, from the second router, an acknowledgement message to the first router, the acknowledgement message indicating that the service was installed on the second router.

5. The method of claim 1, further comprising:
   populating the advertisement message with a service attribute TLV, the service attribute TLV comprising at least one of:
      quality-of-service (QOS) information indicating an amount of bandwidth allocated for the service; or
      a maximum transmission unit (MTU) for packets communicated by the service.

6. The method of claim 1, further comprising:
   populating the advertisement message with a service measurement TLV, the service measurement TLV comprising a request to provide measurement information indicating a round-trip delay associated with the advertisement message and an acknowledgement message.

7. The method of claim 1, wherein the advertisement message includes a Yang data TLV.

8. A head-end router comprising:
   one or more processors; and
   one or more non-transitory computer-readable media storing computer-executable instructions that, when executed by the one or more processors, cause the one or more processors to perform operations comprising:
      generating, at the head-end router, an advertisement message indicating a service that is installed on the head-end router and configures the head-end router to establish network paths with other devices that have the service installed;
      populating the advertisement message with a service request Type-Length-Value (TLV), the service request TLV including information for installing the service on a tail-end router, the information including at least one of:
         a service identifier that identifies the service that is being requested to be installed on the tail-end router; or service-location information indicating a location at which the tail-end router installs the service,
wherein the service configures the head-end router and tail-end router to establish a network path; and
sending, from the head-end router, the advertisement message to the tail-end router such that the tail-end router installs the service and is configured to establish the network path with the head-end router.

9. The head-end router of claim 8, wherein the service-location information includes:
a Media Access Control (MAC) address associated with onboarding the tail-end router with the service; and
an indication of a Virtual Local Area Network (VLAN) over which the tail-end router is onboarded with the service.

10. The head-end router of claim 8, further comprising:
populating the advertisement message with a service-acknowledgement TLV, the service-acknowledgement TLV comprising:
a service identifier that indicates that the service was installed on the tail-end router; and
an Internet Protocol (IP) address associated with the tail-end router.

11. The head-end router of claim 10, further comprising:
installing the service on the tail-end router; and
sending, from the tail-end router, an acknowledgement message to the head-end router, the acknowledgement message indicating that the service was installed on the tail-end router.

12. The head-end router of claim 8, further comprising:
populating the advertisement message with a service attribute TLV, the service attribute TLV comprising at least one of:
quality-of-service (QOS) information indicating an amount of bandwidth allocated for the service; or
a maximum transmission unit (MTU) for packets communicated by the service.

13. The head-end router of claim 8, further comprising:
populating the advertisement message with a service measurement TLV, the service measurement TLV comprising a request to provide measurement information indicating a round-trip delay associated with the advertisement message and an acknowledgement message.

14. The head-end router of claim 8, wherein the advertisement message includes a Yang data TLV.

15. A method for a tail-end router to install a service using information provided from a head-end router, the method comprising:
receiving, at the tail-end router, an advertisement message from the head-end router, the advertisement message including:
an indication of a service that is installed on the head-end router; and
a service request Type-Length-Value (TLV), the service request TLV including information for installing the service on the tail-end router, the information including at least one of:
a service identifier that identifies the service that is being requested to be installed on the tail-end router; or
service-location information indicating a location at which the tail-end router installs the service,
wherein the service configures the head-end router and the tail-end router to establish a network path;
installing the service on the tail-end router based at least in part on the service request TLV; and
using the service, establishing the network path with the head-end router.

16. The method of claim 15, wherein the service-location information includes:
a Media Access Control (MAC) address associated with onboarding the tail-end router with the service; and
an indication of a Virtual Local Area Network (VLAN) over which the tail-end router is onboarded with the service.

17. The method of claim 15, wherein the advertisement message includes a service-acknowledgement TLV, the service-acknowledgement TLV comprising:
a service identifier that indicates that the service was installed on the tail-end router; and
an Internet Protocol (IP) address associated with the tail-end router.

18. The method of claim 17, further comprising:
sending, from the tail-end router, an acknowledgement message to the head-end router, the acknowledgement message indicating that the service was installed on the tail-end router.

19. The method of claim 15, further comprising:
populating the advertisement message with a service attribute TLV, the service attribute TLV comprising at least one of:
quality-of-service (QOS) information indicating an amount of bandwidth allocated for the service; or
a maximum transmission unit (MTU) for packets communicated by the service.

20. The method of claim 15, wherein the advertisement message includes a Yang data TLV.

* * * * *